United States Patent

[11] 3,622,208

| [72] | Inventor | Allen D. Krugler, Jr.<br>Livonia, Mich. |
|---|---|---|
| [21] | Appl. No. | 1,664 |
| [22] | Filed | Jan. 9, 1970 |
| [45] | Patented | Nov. 23, 1971 |
| [73] | Assignee | Ford Motor Company<br>Dearborn, Mich. |

[54] ANALOG CIRCUIT FOR DETECTING DEVIATIONS FROM A PREDETERMINED PERCENTAGE WHEEL SLIP IN AN ANTISKID BRAKE SYSTEM
4 Claims, 7 Drawing Figs.

[52] U.S. Cl. .................................................. 303/21 BE,
188/181 C, 303/20, 317/5, 318/52, 324/161
[51] Int. Cl. ........................................................ B60t 8/08,
B60t 8/10
[50] Field of Search ........................................... 188/181;
303/21; 307/120; 317/5; 324/161; 328/146;
340/263, 268; 303/20; 318/52

[56] References Cited
UNITED STATES PATENTS

| 3,498,682 | 3/1970 | Mueller et al. | 303/21 BE |
| 3,394,967 | 7/1968 | Lucien | 303/21 BE |
| 3,401,984 | 9/1968 | Williams et al. | 303/21 BE |
| 3,467,443 | 9/1969 | Okamoto et al. | 303/21 BE |
| 3,482,887 | 12/1969 | Sheppard | 303/21 EB |

*Primary Examiner*—Milton Buchler
*Assistant Examiner*—Stephen G. Kunin
*Attorneys*—John R. Faulkner and Donald J. Harrington ABSTRACT: An electronic circuit for detecting the percentage of wheel slip in the brake system of a wheeled vehicle wherein a synthesized vehicle velocity voltage is combined with a memorized voltage produced by a wheel speed pickup device at the instant the vehicle brakes are applied, the resulting signal being modified by the voltage produced by the speed pickup device at any instant during the braking interval thereby resulting in an output signal which may be used by a wheel brake actuator to correct the wheel braking torque whenever the output signal exceeds a value corresponding to a predetermined wheel slip.

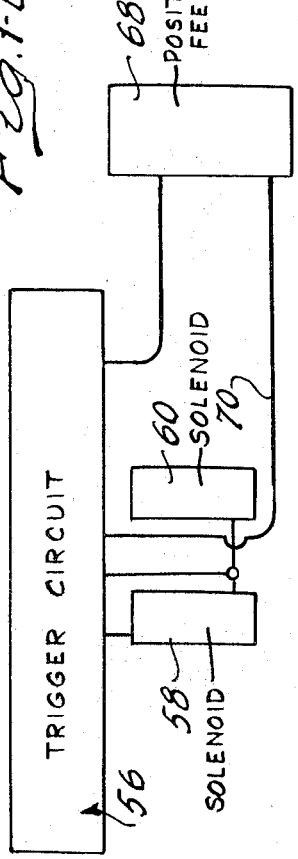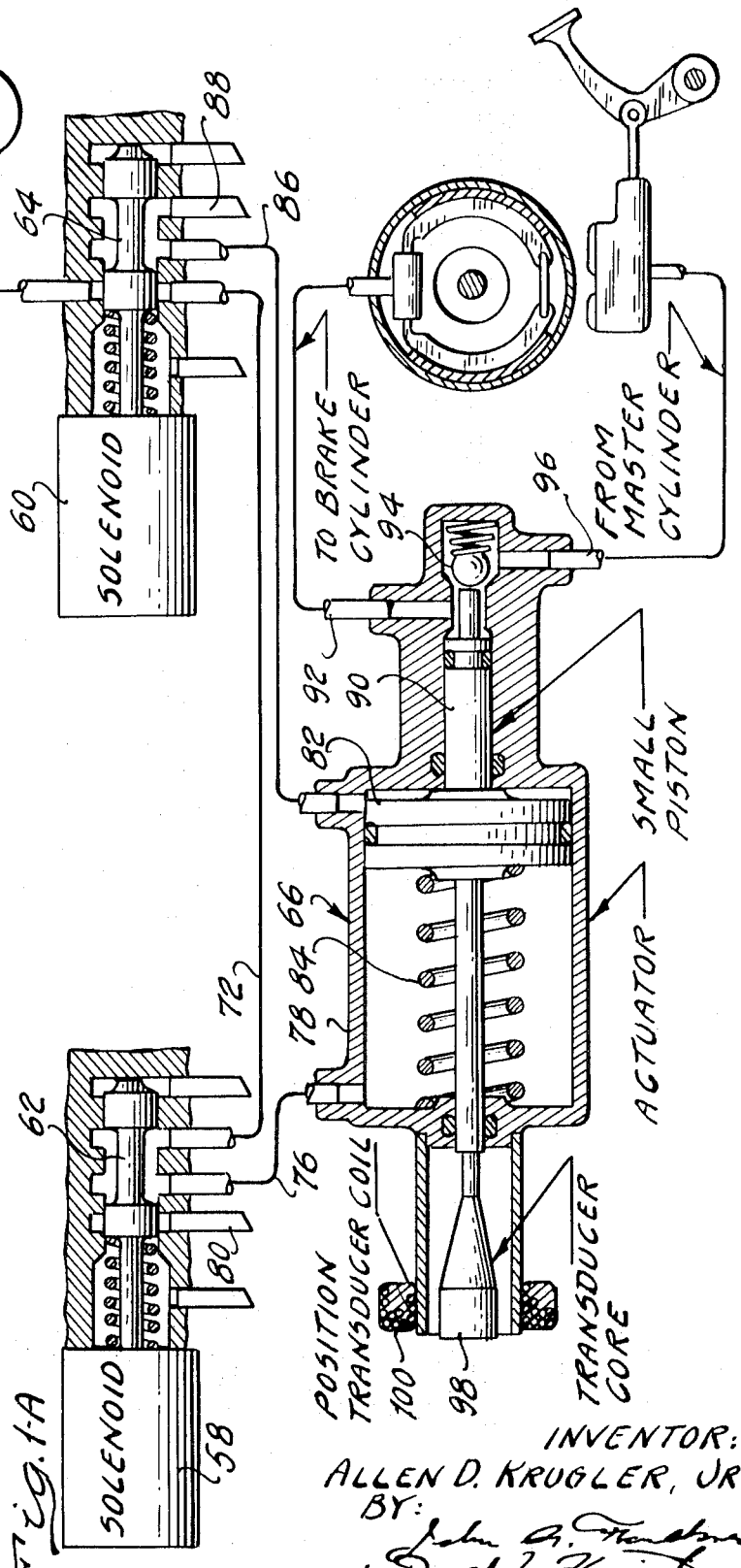

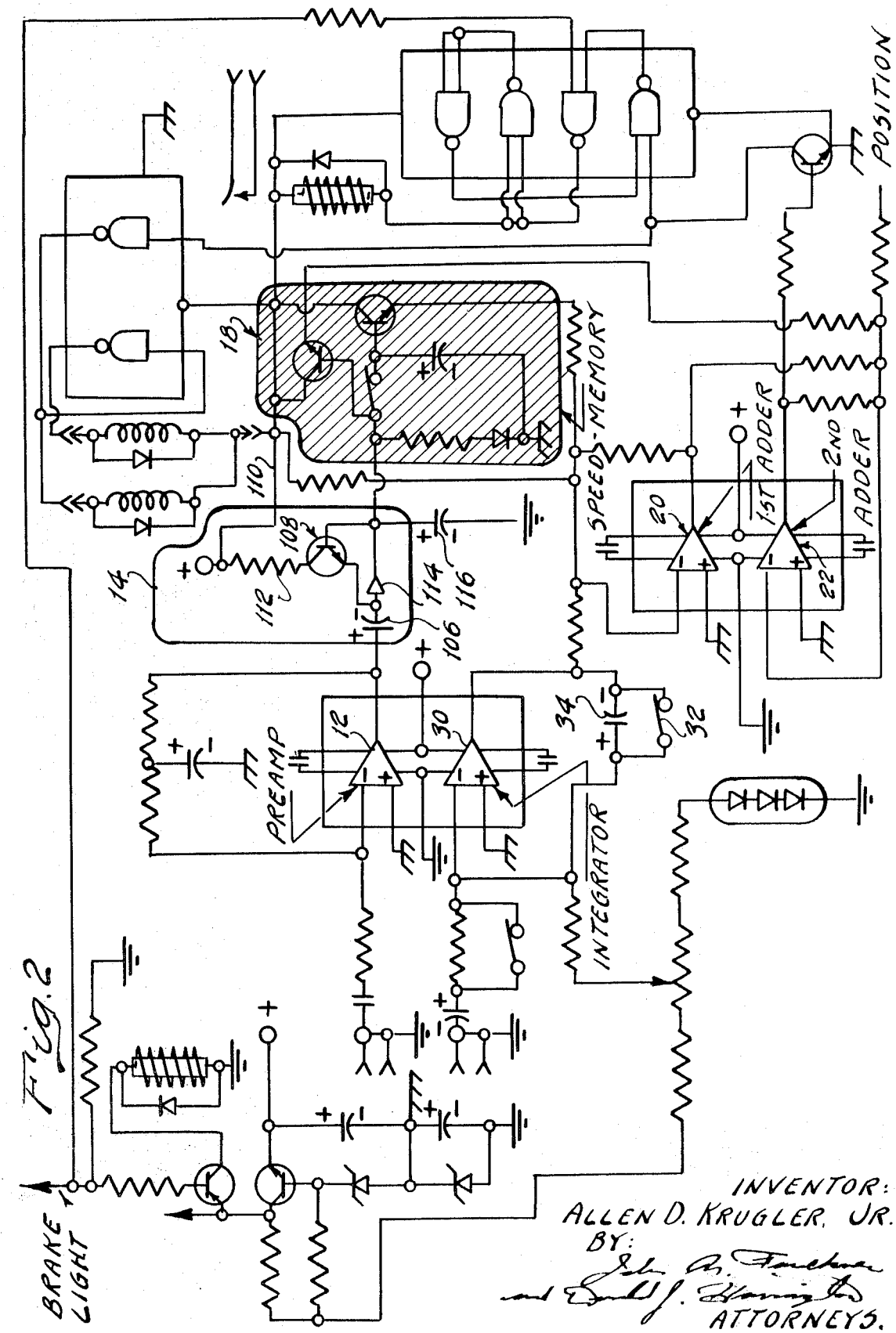

INVENTOR:
ALLEN D. KRUGLER JR.
BY:
ATTORNEYS.

ANALOG CIRCUIT FOR DETECTING DEVIATIONS FROM A PREDETERMINED PERCENTAGE WHEEL SLIP IN AN ANTISKID BRAKE SYSTEM

GENERAL DESCRIPTION OF THE INVENTION

The improvements of my invention are adapted to be used in an antiskid brake system such as that disclosed in copending application of Zbigniew J. Jania and Lawrence J. Vanderberg, Ser. No. 3,122, filed Jan. 15, 1970. Reference may be had to that copending application for a particular description of a wheel brake pressure actuator and a control circuit for the actuator for producing input voltage pulses.

Some known antiskid brake systems, as well as the previously mentioned brake system disclose by Jania and Vanderberg, are effective to modify the braking pressure of the vehicle wheel brakes when a signal representing the difference between the actual wheel speed and the wheel speed that would be compatible with the instantaneous vehicle speed exceeds a predetermined value. This is known as the wheel speed error analog. If the wheel speed error exceeds a desired value, such as seven miles per hour, the control system is triggered so that the actuator will cause appropriate modification of the wheel brake pressure and relieve braking torque, thereby allowing the wheels to accelerate to a value such that the differential wheel speed error is within the desired tolerance range. More effective braking control can be achieved, however, if the parameter used in the analog control system is a wheel slip percentage signal rather than an absolute speed error. The most effective braking coefficient occurs when the wheel slip percentage is of a predetermined value regardless of the vehicle speed. My control system is capable of supplying a useful voltage signal which will cause a controlled response to occur whenever the vehicle wheel slip percentage exceeds a predetermined value regardless of the instantaneous road speed.

If the wheel slip percentage is used as a control parameter rather than an absolute speed differential, improved vehicle control is achieved during a so-called panic stop because wheel slip at the tire-road interface will remain within reasonable limits. Directional stability or yaw control of the vehicle is improved. Stopping distances are substantially reduced as a result of the improved braking coefficient at the tire-road interface for all road surfaces.

My improved speed control system comprises a wheel speed or a drive shaft speed pickup wherein the output frequency that is developed is proportional to the average wheel speed for the wheels that are controlled. This signal is amplified to produce a rectangular wave form of constant amplitude, the frequency being proportional, of course, to the wheel speed. This wave form is converted to a useful DC signal by a frequency to voltage converter. At any instant prior to the application of the wheel brakes, the output voltage of the frequency to voltage converter is an indicator of vehicle speed. That signal is applied to a vehicle speed memory circuit. When the brakes are applied, the braking mode begins and the memory circuit is isolated. The memorized voltage is retained in the system throughout the braking mode. The speed pickup signal during the braking mode no longer is an indicator of vehicle speed, but it is an indicator of wheel speed. This signal, together with the memorized voltage signal and a synthesized vehicle speed signal, is distributed to a voltage summing circuit to produce an output signal. By appropriately choosing the circuit constants, that signal, when it achieves a predetermined threshold value, will indicate a predetermined percentage slip at any instant during the braking mode.

The synthesized voltage signal that is used to indicate vehicle speed during the braking mode comprises a linear accelerometer having an average DC output voltage that varies according to the deceleration, supply voltage, road grade and environmental conditions such as temperature. The output signal of the accelerometer is distributed to an analog integrator which begins to function the instant the brakes are applied.

The deceleration signal may be regarded as a second differential of the vehicle displacement function which, when integrated as a functional value from time $t=0$ to some other value of time within the braking mode, will result in a first order linear characteristic that is an indicator of vehicle velocity. This so-called synthesized velocity signal then is added by a first adder amplifier circuit to the memorized initial vehicle speed.

The wheel slip information and the synthesized vehicle speed information are used to detect wheel slip. For this purpose a second adder amplifier circuit is used. This receives the negative analog of vehicle speed since the integrator stage is also an inverting stage. The second adder receives also a wheel speed analog and, if desired a third feedback signal from the brake pressure modulator can be used.

When the slip percentage error exceeds a predetermined value, the output signal voltage of the second adder will have achieved a corresponding predetermined value. If the so-called preprogrammed value for the wheel slip at any time during the braking mode is exceeded, a logic switching circuit is triggered, thereby operating an isolating valve in the actuator and causing brake pressure modulation.

BRIEF DESCRIPTION OF THE FIGURES OF THE DRAWING

FIG. 1A and 1B show in block diagram form the actuator and the trigger circuit for controlling the actuator, which circuit responds to the output signal of the structure of FIG. 1.

FIG. 2 shows a working embodiment of the preamplifier, the integrator, the frequency to voltage converter and the adders used in the circuit of FIG. 1.

PARTICULAR DESCRIPTION OF THE INVENTION

Figure 1:
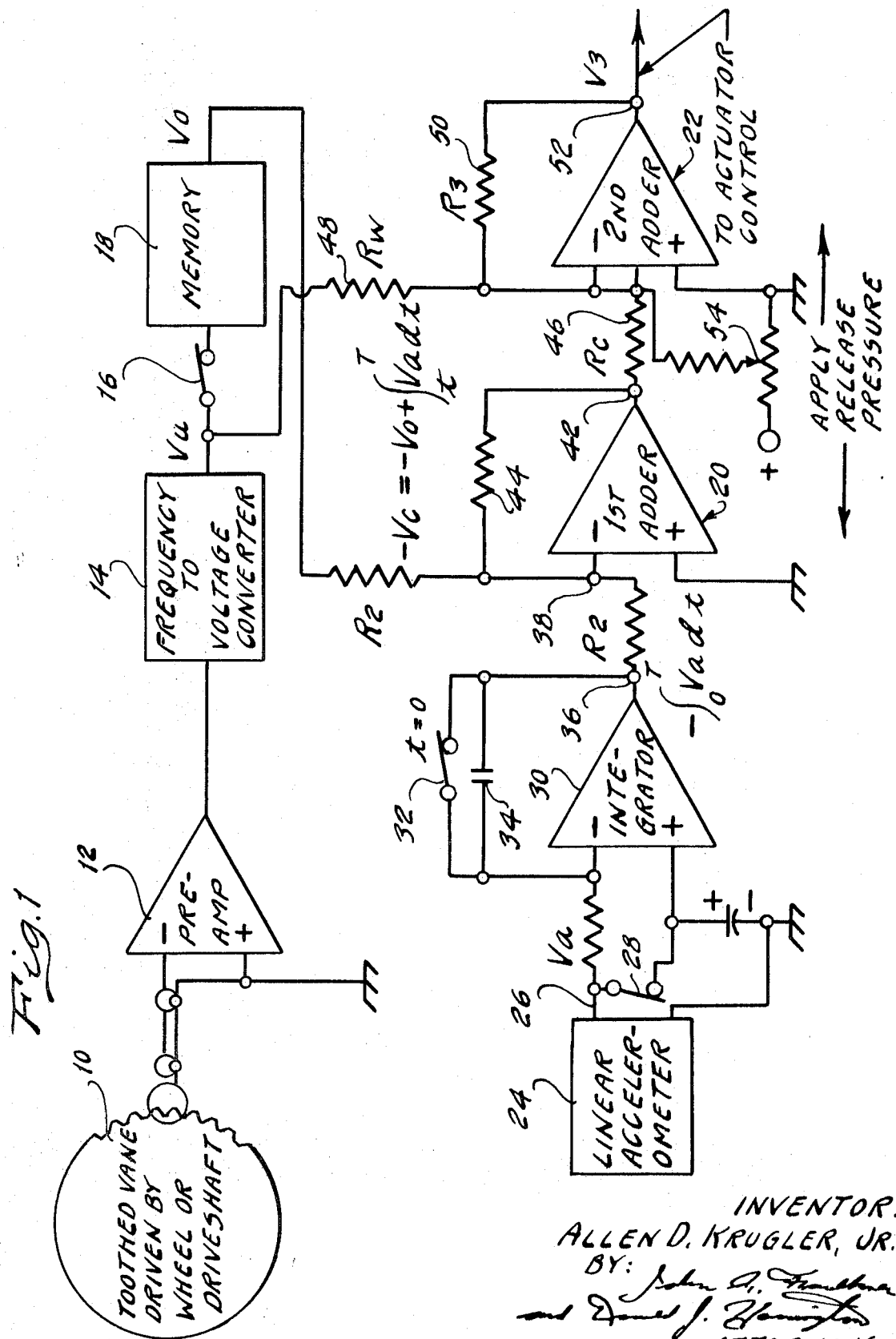
FIG. 1 is a schematic circuit drawing of the improved wheel slip signal-generating components, including both wheel velocity and vehicle speed analog devices.

In FIG. 1 numeral 10 designates in schematic form a wheel speed pickup device. This can be in the form of a toothed disc drivably connected to a vehicle wheel or, in the case of a rear wheel drive vehicle, to the drive shaft for the rear traction wheels. The individual teeth of the disc, as they are rotated by the vehicle wheel or the drive shaft pass through the inductance field of an inductance coil, thereby providing voltage pulses, the frequency of which is an indicator of the speed of rotation of the disc. These pulses are distributed to a preamplifier circuit 12, the output of which is an amplified voltage signal with a rectangular wave form of constant amplitude. A frequency to voltage converter 14 receives the signal of the preamplifier and develops a DC voltage signal having an average value that is proportional to vehicle speed.

A switch 16 connects the output side of the frequency to voltage converter 14 with a memory circuit 18. The memory circuit then receives continuously a signal from the wheel speed pickup device 10 whenever the vehicle is operating in a normal driving mode without braking. The output voltage $V_0$ supplied from the memory circuit at that time is equal to the output voltage $V_u$ of the frequency to voltage converter.

When the vehicle brakes are applied, switch 16 is opened. This marks the initiation of the braking mode at the instant $t=0$. At that time the memory circuit is isolated from the pickup device 10. Although the wheel speed may fall to a value less than the value that existed at $t=0$, the output voltage $V_0$ remains constant. This then is a so-called memorized voltage.

The actual wheel speed, which is indicated by the voltage signal $V_U$, becomes less than the vehicle speed that existed at $t=0$ as soon as incipient wheel slipping occurs.

The memorized voltage $V_0$ is distributed to the first adder circuit 20 and the signal $V_u$ is distributed to a second adder circuit 22. Both signals are used by the two adder circuits as well as a signal that represents the linear deceleration of the vehicle. This signal is obtained by a linear accelerometer 24 which responds to inertia forces to develop a signal in line 26 beginning with $t=0$. A bypass switch 28 is opened during the beginning of the braking mode, and the voltage signal in line 26 then is an indicator of the instantaneous deceleration. This value may be considered as a second differential of the relationship between travel and time. An integrator circuit 30 integrates this signal to produce a linear relationship which is a measure of vehicle velocity. The integrator circuit has a high gain amplifier with a negative output. It normally is bypassed with a normally closed switch 32. The switch 32 is opened, however, at $t=0$ and remains open during the braking mode.

The control capacitor 34 of the integrator 30 operates with a negative high gain amplifier component to produce a voltage at point 36 which, at any instant during the braking mode, is equal to $$-\int_{t=0}^{t=T} V_a dt$$

where $V_a$ = the voltage in line 26. This value is combined at point 38 with the voltage $V_0$ on the input side of the first adder 20. Because the signals are of opposite sign, the first adder then receives the difference between the two signals. Thus the output voltage $V_c$ at point 42 equals the quantity:

$$-V_c = -V_0 + \int_{t=0}^{t=T} V_a dt$$

A control resistance 44 is in parallel relationship with respect to the high gain amplifier elements of the adder 20.

The second adder 22 is connected at its input side to the output of the first adder. A suitable control resistance $R_c$ shown at 46 is interposed between the output side of the first adder and the input side of the second adder. The frequency to voltage converter 14, which develops a signal $V_u$, is connected also to the same input side of the second adder 22 through a second control resistance $R_w$, as indicated at 48. The magnitude of the resistance $R_w$ is less than the resistance $R_c$.

The second adder also has a control resistance 50 in parallel relationship with high gain amplifier elements. The resultant of the two inputs for the second adder 22 is a voltage signal $V_3$ at point 52, which is equal to the quantity:

$$-\frac{R_3}{R_w}V_u + \frac{R_3}{R_o}V_o$$

In addition to the so-called wheel speed analog $V_u$ and the negative analog of the vehicle speed, $-V_c$, a third position feedback signal from the brake actuator can be used. This may be the output of a potentiometer 54, the movable element of which is connected to the movable actuator for the brake pressure modulator. Other feedback operations, of course, could be used instead.

The signal output of the potentiometer 54, when combined or added algebraically to the wheel speed analog and the vehicle speed analog, will vary within predetermined tolerance limit the threshold value for the controlled vehicle slip signal thereby making the feed back control for the system more sensitive. If it is assumed, however, that the auxiliary feedback signal produced by the potentiometer 54 is not present, the output signal $V_3$ at point 52 on the output side of the second adder 22 will be equal to the quantity indicated earlier.

If one chooses to make the digital circuit respond to any value of $V_3$ equal to or greater than 0, then the value of $V_u$ may be computed by setting $V_3=0$.

$$V_u \text{ then} = V_o \times \left[1 - \frac{S}{100\%}\right]$$

If this value for $V_u$ is substituted in the equation for $V_3$, and if $R_w$ is solved in terms of $R_C$, then $$R_w = R_o\left[1 - \frac{S}{100\%}\right]$$

The threshold value then is determined by appropriately choosing the values of $R_W$ and $R_C$. For any quantity $V_3$ greater than that threshold value, the trigger circuit shown at FIG. 1B will be energized.

The trigger circuit is indicated in FIG. 1B by reference character 56. It receives the input signal $V_3$ and triggers the operation of solenoid 58 or solenoid 60, each solenoid actuating a pressure distributor valve shown, respectively, a 62 and 64. These valves in turn control the operation of a fluid pressure actuator 66. A position transducer feedback device, shown schematically at 68, distributes through feedback line 70 a feedback signal which is sensed by the trigger circuit 56. The trigger circuit thus anticipates the response of the actuator prior to the instant at which the actuator would normally have completed its pressure modulating function.

When the solenoid 58 is triggered, valve 62 is moved in a left-hand direction from the position shown in FIG. 1A. This interrupts communication between passage 72, which receives control pressure from a positive displacement pump 74, and passage 76 extending to cylinder 78 of the actuator 66. Communication is established between passage 76 and the exhaust port 80.

Piston 82 is slidably situated in the cylinder 78. It is biased normally in a right-hand direction by spring 84. The right-hand side of the piston 82 is subjected to pressure in passage 86 extending from he valve 64. Normally this passage is exhausted through port 88. If the signal $V_3$ should increase beyond the threshold point, solenoid 60 is actuated, thereby moving the valve 64 in a left-hand direction to establish fluid communication between supply passage 72 and passage 86. This causes the piston 82 to move in a left-hand direction.

A small piston 90 is in fluid communication with brake pressure line 92 extending to the wheel brake cylinders. As the piston 90 is moved in a left-hand direction, the fluid space occupied by the brake fluid is expanded, thereby causing a reduction in brake pressure. At the same time a ball check valve 94 situated between the passage 92 and a passage 96 tends to isolate the former from the latter. Passage 96 extends from the master brake cylinder for the vehicle.

As soon as solenoid 60 is actuated, a transducer core 98, which is connected to the piston 82, begins to move in a left-hand direction. An inductance core 100, which forms a part of the trigger circuit 56, surrounds the core 98. Its inductance depends upon the position of the piston 82. A change in inductance induces a response in the digital circuitry causing solenoid 60 again to become deactivated. This then exhausts the pressure in passage 86 and the movement of the piston 82 towards its limiting position is interrupted. If an excessive wheel slip signal $V_3$ continues, the cycle is repeated. Oscillatory motion of the piston 82 results in a modulating action which produces modified brake line pressure and tends to maintain the wheel slip at the calibrated value.

Figure 5:
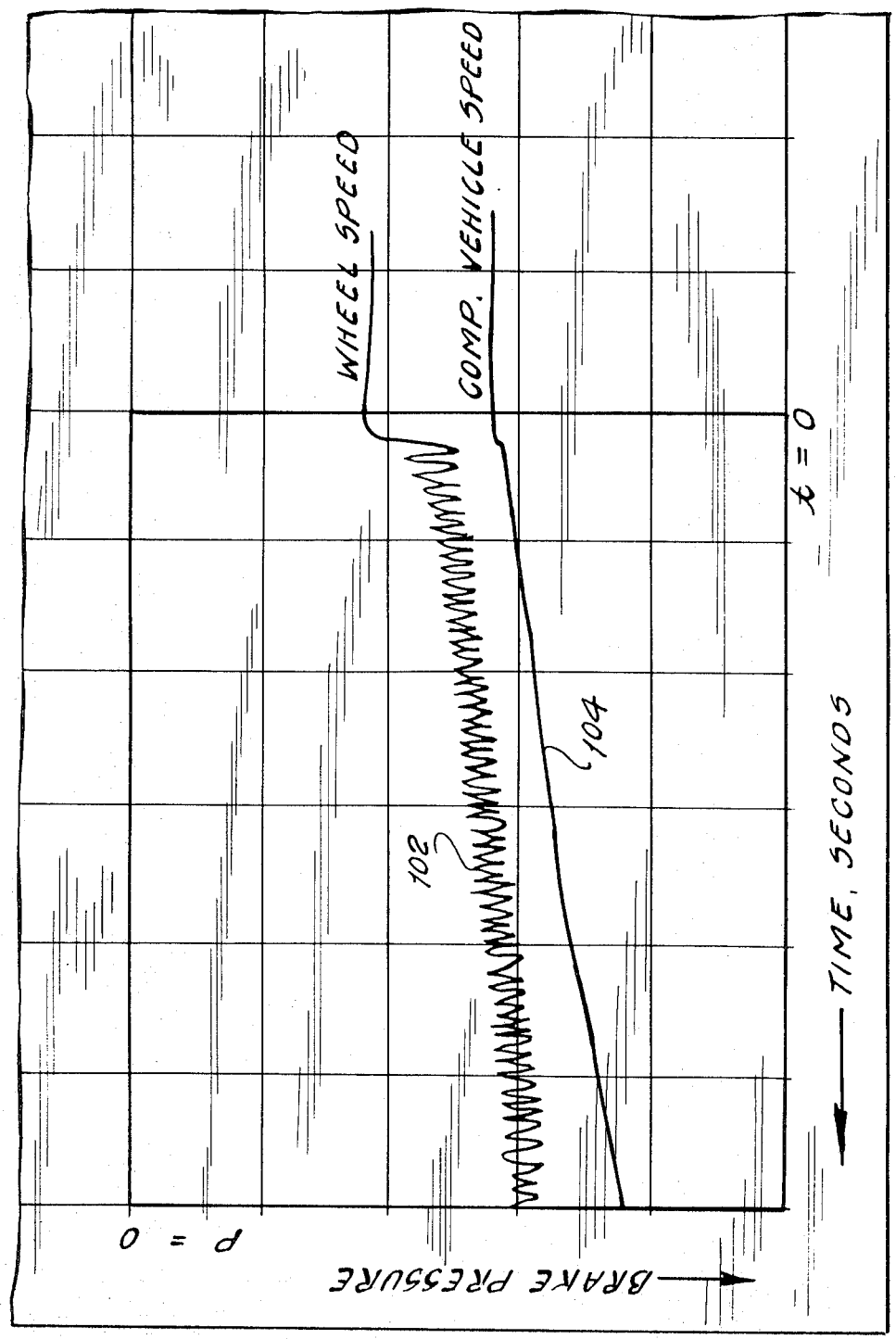
FIG. 5 is a trace recording of velocity speed change during a typical vehicle wheel braking mode.

In FIG. 5 the affect of changes in the effective brake pressure is illustrated by means of a test trace recording in which the recording time extends along a horizontal axis in a negative direction. The wheel speed at any instant due to changes in the pressure in the wheel brake cylinders is indicated by the fluctuating line 102. The comparable vehicle speed which would exist if no slipping occurred is of a value slightly greater than the wheel speed value as shown at 104. The average percentage error at any instant during the braking mode then can be found by subtracting the average value on curve 102 at any time from the value at that time along curve 104. The ordinate for the chart of FIG. 5 is inverted so that the higher pressures are on the lower part of the graph.

FIG. 5 shows a relatively small overshoot and a fast cycling frequency of approximately 22 cycles per second. This produces accurate wheel speed control about the predetermined slip value. In obtaining this curve 10 percent negative feedback was taken from the brake pressure modulator position potentiometer 54 and added to the speed signals at the input of the second adder.

Figure 3:
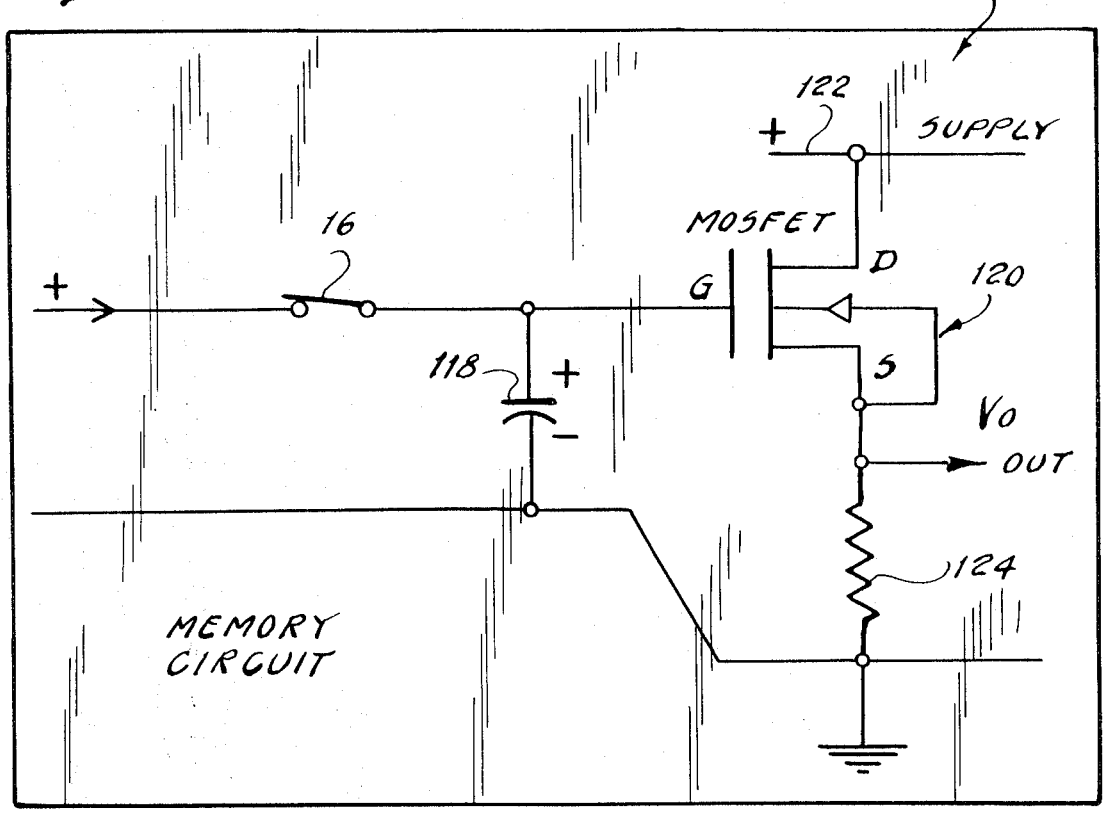
FIG. 3 shows in schematic form a typical memory circuit for use in the circuit of FIGS. 1, 1A and 2.
Figure 4:
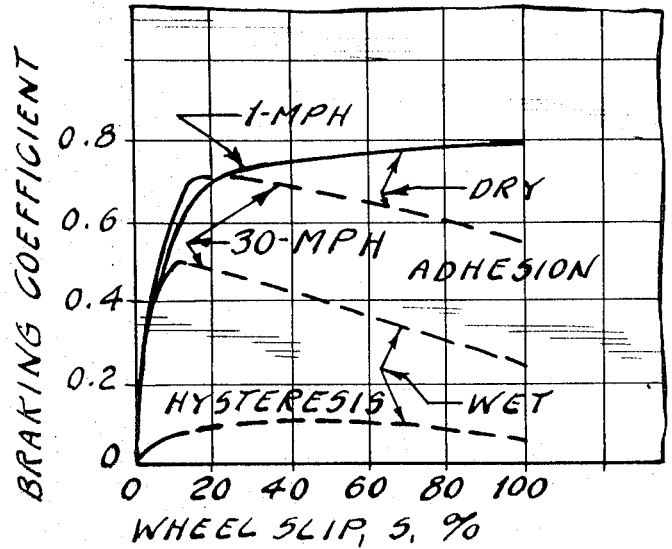
FIG. 4 shows a chart indicating the relationship between wheel slip percentage and brake coefficient for a tire-road interface.

An operating embodiment of the circuit of FIG. 1 is shown at FIG. 2. The frequency to voltage converter 14, as indicated in FIG. 2, includes a capacitor 106 which receives the rectangular wave form signal from the preamplifier 12. Each signal results in a change in the base-emitter bias on transistor 108. When that bias exceeds the threshold value, collector current from the voltage supply line 110 passes through resistor 112 and through diode 114 to one side of capacitor 116, which is the input side of the memory circuit. A typical memory circuit is illustrated in FIG. 3 although it is not necessary to employ this particular form of circuitry. The particular embodiment of FIG. 3 comprises a capacitor 118 which is connected to the gate-controlled field-effect transistor 120, the drain side for which is connected to supply line 122. The sink side of the transistor 122 supplies a control resistor 124 and the voltage appearing across the capacitor then causes the gate to trigger a flow of current through the field-effect transistor 120 causing a voltage drop across resistor 124. This voltage drop is the voltage signal $V_0$, which is used by the first adder 20 in the circuit of FIG. 1 in the manner explained previously.

Having thus described a preferred for of my invention what I claim and desire to secure by U.S. Letters Patent is:

1. In a control system for an antiskid wheel brake system for a wheeled vehicle having individual wheel brakes, a vehicle wheel speed signal generator, means for amplifying the wheel speed signal, a source of a vehicle speed signal, a memory circuit having a voltage input side connected to the output side of said generator, switch means for disconnecting said memory circuit from said voltage generator at the inception of a wheel-braking mode whereby the memory voltage at the output side of said memory circuit remains relatively uniform throughout the braking mode, means for summing the voltage signal from said vehicle speed signal source and said memory voltage, an operational adding circuit comprising an amplifier, the input side of said amplifier being connected to the output side of said voltage generator, said wheel speed signal being combined with the output signal of said summing means to produce a voltage signal on the output side of said operational adding circuit, said last named signal, upon reaching a threshold value of predetermined magnitude, indicating the percentage difference in the speed of the vehicle wheels during the braking mode with respect to the vehicle speed that would exist without wheel slippage, a wheel brake actuator for modifying the magnitude of the wheel braking effort, and a control circuit for activating and deactivating said actuator, the output signal of said operational adding circuit being distributed to said control circuit for triggering the operation of said actuator, thereby causing a modification in wheel braking effort whenever said threshold value is exceeded, said vehicle speed signal source comprises a linear accelerometer carried by the vehicle, a voltage integrator circuit connected to the output side of said accelerometer for integrating the signal received from said accelerometer to produce a resultant speed signal that is an indicator of vehicle speed at any instant during the braking mode, said summing means comprising another adding circuit in the form of a second operational amplifier connected to the output side of the integrator circuit, and means for distributing the sum of said resultant speed signal and said memory voltage to said second operational amplifier thereby producing one of the voltage input signals for said first named amplifier.

2. The combination as set forth in claim 1 wherein the connection between generator and the input side of said operational adding circuit comprises a first control resistance, the connection between said vehicle speed signal source and said operational adding circuit comprising a second control resistance, the magnitude of the threshold value of the output voltage of said operational adding circuit being determined by the relative values of said resistances.

3. The combination as set forth in claim 1 wherein said accelerometer is an inertial accelerometer and said voltage integrator circuit is connected to the output side of said accelerometer to produce said resultant speed signal and control resistances in the connections between first-named amplifier and said vehicle speed signal source and between said first-named amplifier and said generator whereby the magnitude of the output signal for said operational adding circuit may be calibrated.

4. In a control system for an antiskid wheel brake system for a wheeled vehicle having individual wheel brakes, a vehicle wheel speed signal generator, means for amplifying the wheel speed signal, a source of a vehicle speed signal, a memory circuit having a voltage input side connected to the output side of said generator, switch means for disconnecting said memory circuit from said voltage generator at the inception of a wheel-braking mode whereby the memory voltage at the output side of said memory circuit remains relatively uniform throughout the braking mode, means for summing the voltage signal from said vehicle speed signal source and said memory voltage, an operational adding circuit comprising an amplifier, the input side of said amplifier being connected to the output side of said voltage generator, said wheel speed signal being combined with the output signal of said summing means to produce a voltage signal on the output side of said operational adding circuit, said last-named signal, upon reaching a threshold value of predetermined magnitude, indicating the percentage difference in the speed of the vehicle wheels during the braking mode with respect to the vehicle speed that would exist without wheel slippage, a wheel brake actuator for modifying the magnitude of the wheel braking effort, and a control circuit for activating and deactivating said actuator, the output signal of said operational adding circuit being distributed to said control circuit for triggering the operation of said actuator, thereby causing a modification in wheel braking effort whenever said threshold value is exceeded, said vehicle speed signal source comprises a linear accelerometer carried by the vehicle, a voltage integrator circuit connected to the output side of said accelerometer for integrating the signal received from said accelerometer to produce a resultant speed signal that is an indicator of vehicle speed at any instant during the braking mode, said summing means comprising another adding circuit in the form of a second operational amplifier connected to the output side of the integrator circuit, and means for distributing the sum of said resultant speed signal and said memory voltage to said second operational amplifier thereby producing one of the voltage input signals for said first-named amplifier, means for producing a position feedback voltage signal from said actuator and a connection between said last-named means and the input side of said operational adding circuit for modifying the effective value of said output signal from said operational adding circuit.

* * * * *